United States Patent
Ohnishi et al.

(10) Patent No.: US 12,180,022 B2
(45) Date of Patent: Dec. 31, 2024

(54) ALIGNMENT DEVICE

(71) Applicant: Totani Corporation, Kyoto (JP)

(72) Inventors: Yuji Ohnishi, Kyoto (JP); Toshiki Nagasawa, Kyoto (JP)

(73) Assignee: Totani Corporation, Kyoto (JP)

( * ) Notice: Subject to any disclaimer, the term of this patent is extended or adjusted under 35 U.S.C. 154(b) by 424 days.

(21) Appl. No.: 17/782,609

(22) PCT Filed: Oct. 1, 2020

(86) PCT No.: PCT/JP2020/037446
§ 371 (c)(1),
(2) Date: Jun. 3, 2022

(87) PCT Pub. No.: WO2021/117321
PCT Pub. Date: Jun. 17, 2021

(65) Prior Publication Data
US 2023/0014103 A1    Jan. 19, 2023

(30) Foreign Application Priority Data

Dec. 11, 2019  (JP) ................................ 2019-223720

(51) Int. Cl.
*B31B 70/10* (2017.01)
*B29C 55/18* (2006.01)
(Continued)

(52) U.S. Cl.
CPC ......... *B65H 23/1888* (2013.01); *B29C 55/18* (2013.01); *B65H 20/005* (2013.01);
(Continued)

(58) Field of Classification Search
CPC .............. B65H 23/188; B65H 23/1888; B65H 2301/5124; B65H 2301/4493;
(Continued)

(56) References Cited

U.S. PATENT DOCUMENTS 9,833,964 B2 * 12/2017 Endou ..................... B31B 70/10
10,493,715 B2 * 12/2019 Totani ..................... B31B 50/18
(Continued)

FOREIGN PATENT DOCUMENTS

JP   4461201 B2   7/2002
JP   4121722 B2   7/2008
(Continued)

OTHER PUBLICATIONS

International Search Report issued Dec. 22, 2020 by the International Searching Authority (Japan Patent Office) in PCT Application PCT/JP2020/037446.

*Primary Examiner* — Leslie A Nicholson, III
(74) *Attorney, Agent, or Firm* — Novo TechIP International PLLC

(57) ABSTRACT

A first feed device adjusts an intermittent feed amount thereof based on output of a first sensor such that a design position of a first panel is aligned with a first fixing position during every pause phase of an intermittent feed cycle. A second feed device adjusts tension of a second panel and an intermittent feed amount of a feed unit based on output of at least one second sensor such that a design position of the second panel is aligned with a second fixing position during every pause phase of an intermittent feed cycle. A third feed device adjusts an intermittent feed amount thereof based on output of a third sensor such that the design position of the first panel is aligned with the second fixing position during every pause phase of an intermittent feed cycle.

6 Claims, 6 Drawing Sheets

(51) Int. Cl.
   *B65H 20/00* (2006.01)
   *B65H 23/188* (2006.01)
   *B29L 31/00* (2006.01)

(52) U.S. Cl.
   CPC ............... *B29L 2031/7128* (2013.01); *B65H 2301/5124* (2013.01); *B65H 2404/743* (2013.01); *B65H 2553/40* (2013.01); *B65H 2701/175* (2013.01); *B65H 2701/191* (2013.01)

(58) Field of Classification Search
   CPC ............ B65H 2701/175; B65H 20/005; B65H 2404/743; B65H 39/16; B29C 55/18; B29L 2031/7128; B31B 70/10; B31B 70/18; B31B 70/006; B31B 70/642; B31B 2155/002
   USPC ........................................... 270/52.07, 52.08
   See application file for complete search history.

(56) References Cited

U.S. PATENT DOCUMENTS

| | | | | |
|---|---|---|---|---|
| 11,834,289 | B2 * | 12/2023 | Yamazaki | .............. B31B 70/006 |
| 11,926,118 | B2 * | 3/2024 | Ohnishi | ................ B65D 75/008 |
| 12,030,273 | B2 * | 7/2024 | Totani | ..................... B31B 70/10 |
| 2011/0091595 | A1 | 4/2011 | Totani | |
| 2014/0099394 | A1 | 4/2014 | Totani | |

FOREIGN PATENT DOCUMENTS

| | | | |
|---|---|---|---|
| JP | 5346113 | B1 | 11/2013 |
| JP | 2015000568 | A | 1/2015 |
| JP | 2017128017 | A | 7/2017 |
| JP | 6288771 | B2 | 3/2018 |

\* cited by examiner

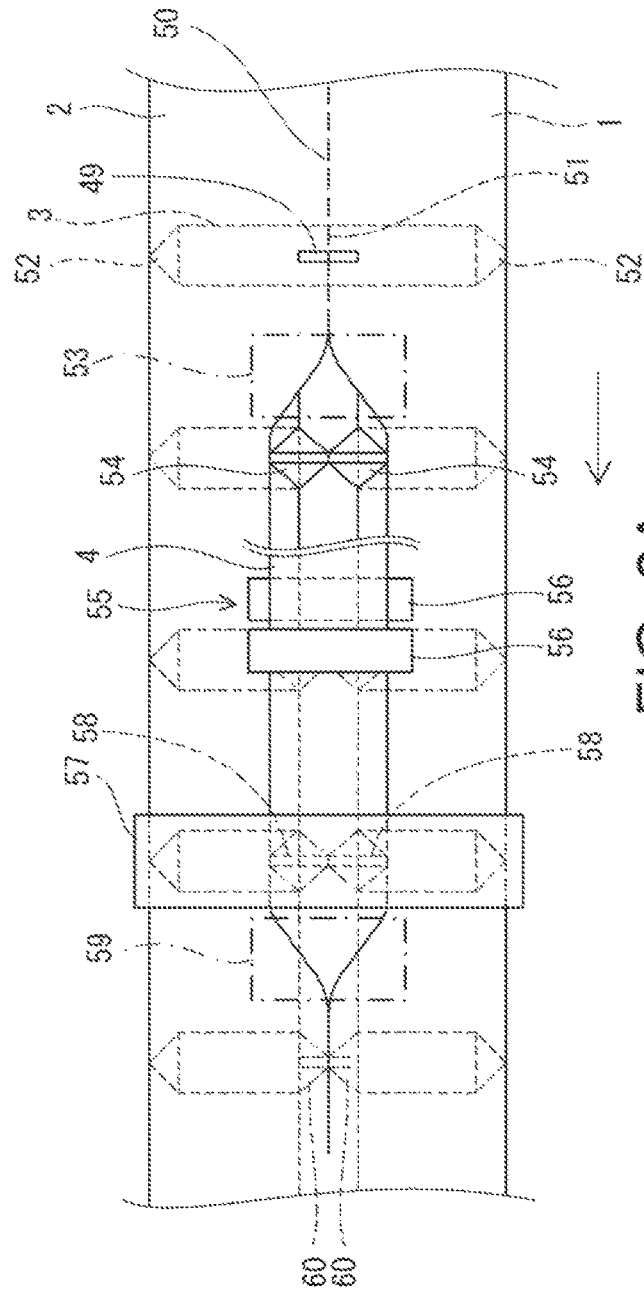
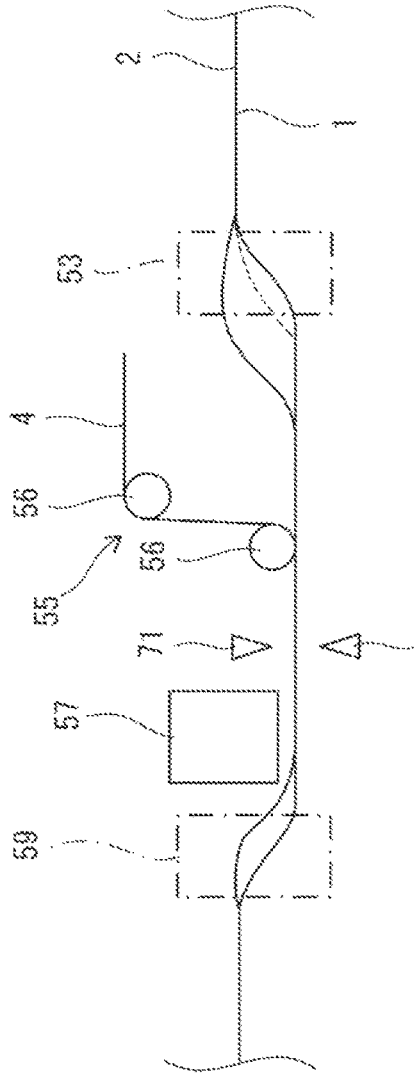
FIG. 2A
FIG. 2B

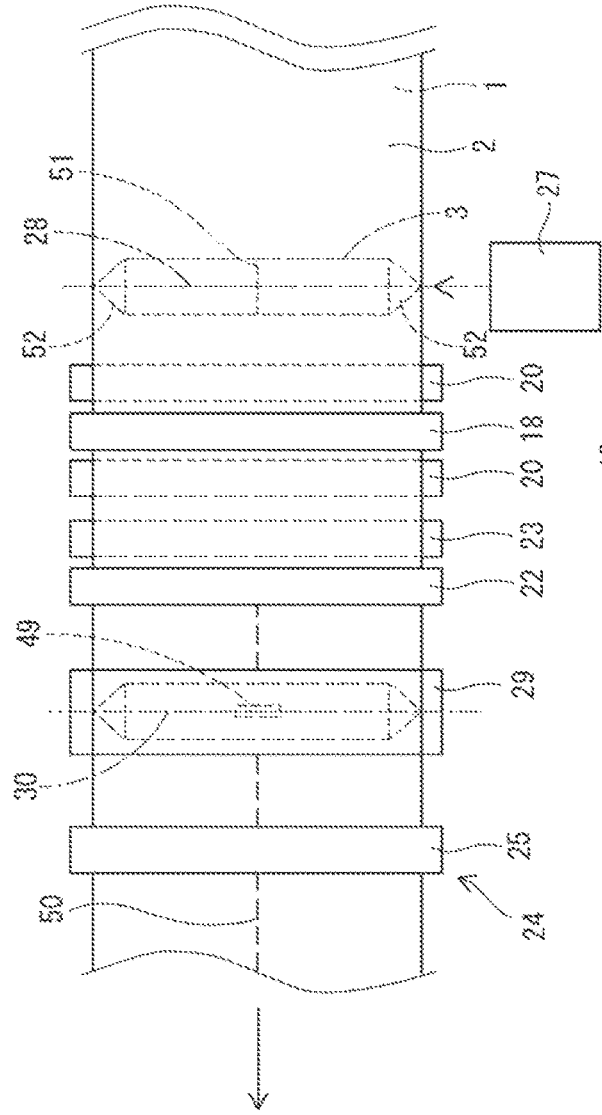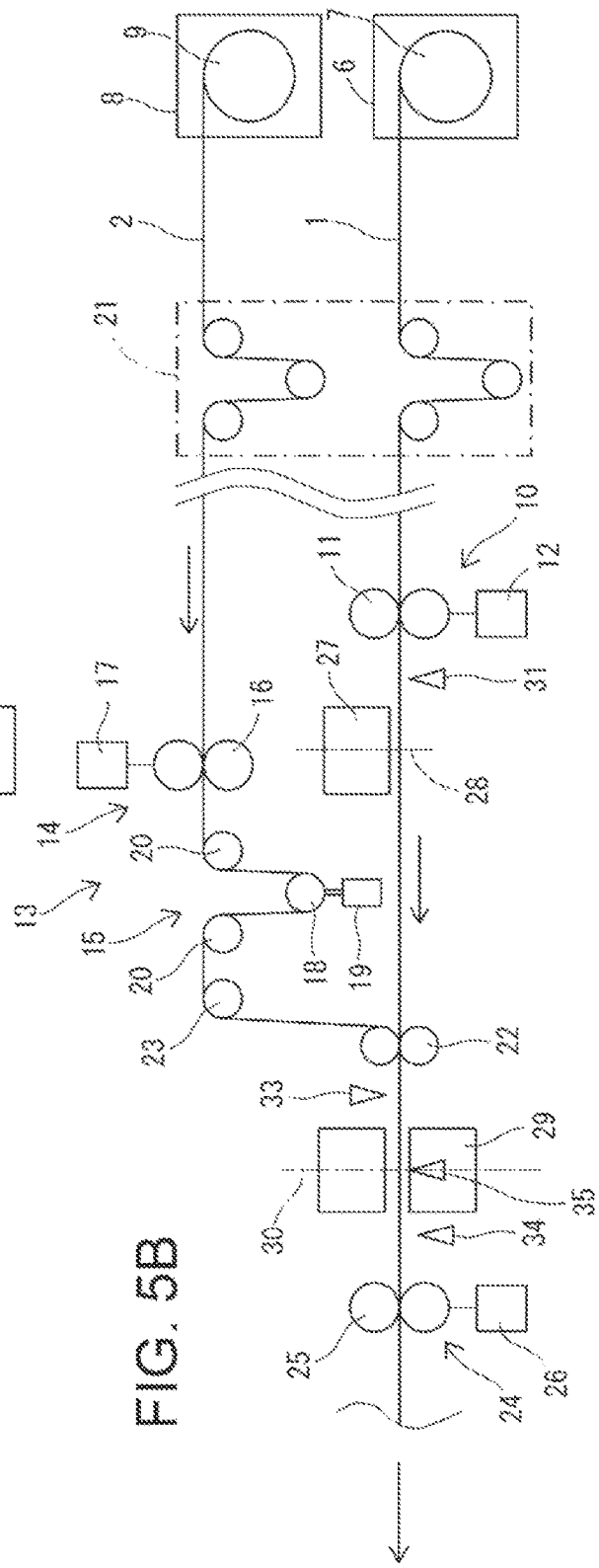

ALIGNMENT DEVICE

TECHNICAL FIELD

The present disclosure relates to an alignment device for use in a bag making apparatus for making bags from a first continuous sheet panel, a second continuous sheet panel, and an additional component, and in particular to prevention of misalignment among the first continuous sheet panel, the second continuous sheet panel, and the additional component.

BACKGROUND

Some bag making apparatuses make printed bags (e.g., plastic bags) from at least two continuous sheet panels. Each of the two sheet panels has print patterns printed at a constant print pitch. When the bag making apparatus fixes the two sheet panels to each other, the print patterns of these panels should be aligned with each other. The misalignment of the print patterns makes the appearance of the bag look bad when the bag is completed.

The misalignment of the print patterns of the sheet panels is caused by the displacement of print on the sheet panel(s) and/or a slight difference in print pitch between the sheet panels. The method of supplying the sheet panels includes a type to slit a wide film unrolled from a single roll, in its longitudinal direction into two continuous sheet panels to then supply these two panels, and a type to unroll two continuous sheet panels from respective different rolls to then supply these two panels. The latter is particularly prone to the misalignment of the print patterns.

As disclosed in Patent document 1 (JP4121722B2), Patent document 2 (JP4461201B2), Patent document 3 (JP5346113B1), and Patent document 4 (JP6288771B2), the arrangements have been proposed which prevent positional misalignment between the sheet panels and thus the misalignment of the print patterns.

Also, some bag making apparatuses incorporate an additional component(s) such as a side gusset(s) and/or a bottom gusset into the sheet panels to make bags from the sheet panels and the additional component. In this case, not only positional misalignment between the two sheet panels, but also positional misalignment between the sheet panels and the additional component should be prevented. However, the arrangements in the Patent documents 1 to 4 do not consider the process of incorporating the additional component.

An object of the present disclosure is to provide an alignment device for use in a bag making apparatus and for preventing misalignment among a first sheet panel, a second sheet panel, and an additional component.

SUMMARY

According to an aspect of the present disclosure, there is provided an alignment device for use in a bag making apparatus for making bags from a first continuous sheet panel, a second continuous sheet panel, and additional components. Both of the first and second continuous sheet panels have print patterns that repeat at a print pitch and each include a detection point therein. Design positions are predetermined on each of the first and second continuous sheet panels at the print pitch. The alignment device includes: a first feed device configured to intermittently feed the first continuous sheet panel; a second feed device including a feed unit configured to intermittently feed the second continuous sheet panel and a stretching unit disposed downstream of the feed unit to apply tension to the second continuous sheet panel in an adjustable manner; a pair of guide rollers disposed downstream of the first and second feed devices; and a third feed device disposed downstream of the pair of guide rollers to intermittently feed the first and second continuous sheet panels superposed on each other by the pair of guide rollers.

The alignment device further includes: a first fixing device configured to fix an additional component to the first continuous sheet panel at a first fixing position downstream of the first feed device and upstream of the pair of guide rollers during every pause phase of an intermittent feed cycle; and a second fixing device configured to fix the second continuous sheet panel to the additional component at a second fixing position downstream of the pair of guide rollers and upstream of the third feed device during every pause phase of an intermittent feed cycle.

The alignment device further includes: a first sensor for detecting the detection point of the first continuous sheet panel at a position downstream of the first feed device and upstream of the pair of guide rollers; at least one second sensor for detecting the detection point of the second continuous sheet panel at a position upstream of the second fixing device; and a third sensor for detecting the detection point of the first continuous sheet panel at a position downstream of the second fixing device and upstream of the third feed device.

The first feed device is further configured to adjust an intermittent feed amount thereof based on output of the first sensor such that a design position of the first sheet panel is aligned with the first fixing position during every pause phase of an intermittent feed cycle. The third feed device is further configured to adjust an intermittent feed amount thereof based on output of the third sensor such that the design position of the first continuous sheet panel is aligned with the second fixing position during every pause phase of an intermittent feed cycle. The second feed device is further configured to adjust said tension and an intermittent feed amount of the feed unit based on output of the at least one second sensor such that a design position of the second continuous sheet panel is aligned with the second fixing position every pause phase of an intermittent feed cycle.

The at least one second sensor may include a downstream sensor for detecting the detection point of the second continuous sheet panel at a position downstream of the pair of guide rollers and upstream of the second fixing device.

The at least one second sensor may further include an upstream sensor for detecting the detection point of the second continuous sheet panel at a position upstream of the feed unit. The feed unit may be configured to adjust the intermittent feed amount thereof in response to output of the upstream sensor. The stretching unit may be configured to adjust said tension in response to output of the downstream sensor.

The stretching unit may be configured to adjust said tension in response to output of the downstream sensor. The feed unit may be configured to adjust the intermittent feed amount thereof in response to adjustment of the tension.

The first fixing device may be a side gusset supply device configured to supply a side gusset as the additional component to the first continuous sheet panel, arrange the side gusset in the width direction of the first continuous sheet panel, and temporarily fix the side gusset to the first continuous sheet panel. The second fixing device may be a seal device configured to seal the side gusset to the first and second continuous sheet panels.

The first feed device may be configured to intermittently feed the first continuous sheet panel unrolled from a first roll. The second feed device may be configured to intermittently feed the second continuous sheet panel unrolled from a second roll.

BRIEF DESCRIPTION OF THE DRAWINGS

FIG. 2A is a schematic plan view of an intermediate section of the bag making apparatus in FIG. 1A, and FIG. 2B is a schematic side view of the bag making apparatus in FIG. 2A.

FIG. 5A is a schematic plan view of an upstream section of a bag making apparatus including another example alignment device, and FIG. 5B is a schematic side view of the bag making apparatus in FIG. 5A.

DETAILED DESCRIPTION

Figure 1A:
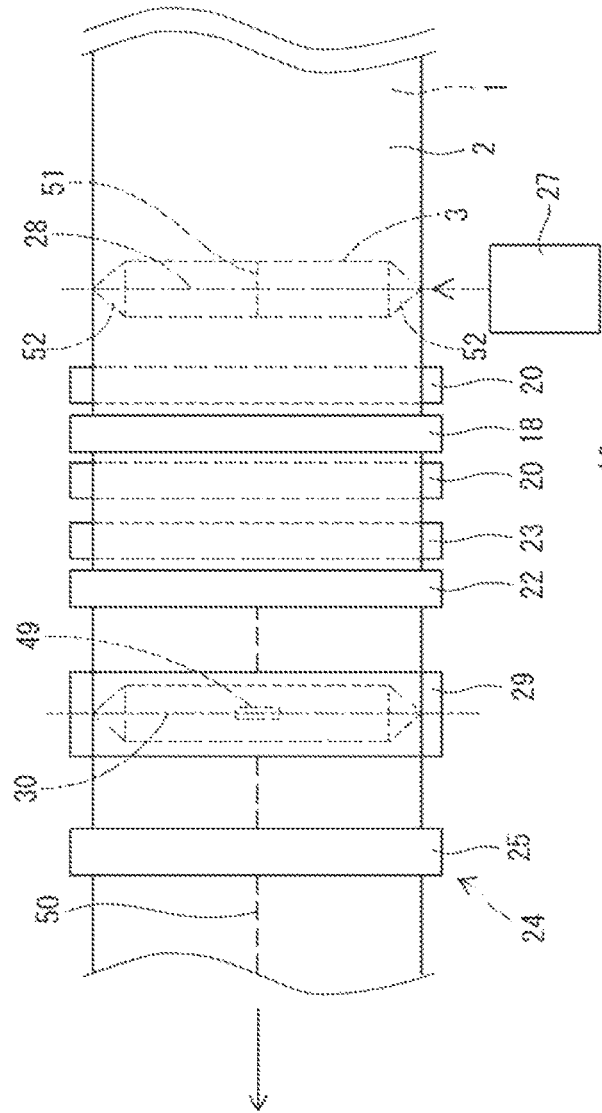
FIG. 1A is a schematic plan view of an upstream section of a bag making apparatus including an example alignment device.

Alignment devices according to implementations will be described below with reference to the drawings.

FIGS. 1A to 3 illustrate a bag making apparatus. The bag making apparatus makes bags 5 (FIG. 3) from a first continuous sheet panel 1, a second continuous sheet panel 2, side gussets 3 (FIG. 1A) and a bottom gusset 4 (FIGS. 2A and 2B). The bags 5 in this implementation are plastic bags, and accordingly these components 1 to 4 of the bags 5 are made of plastic films.

Figure 1B:
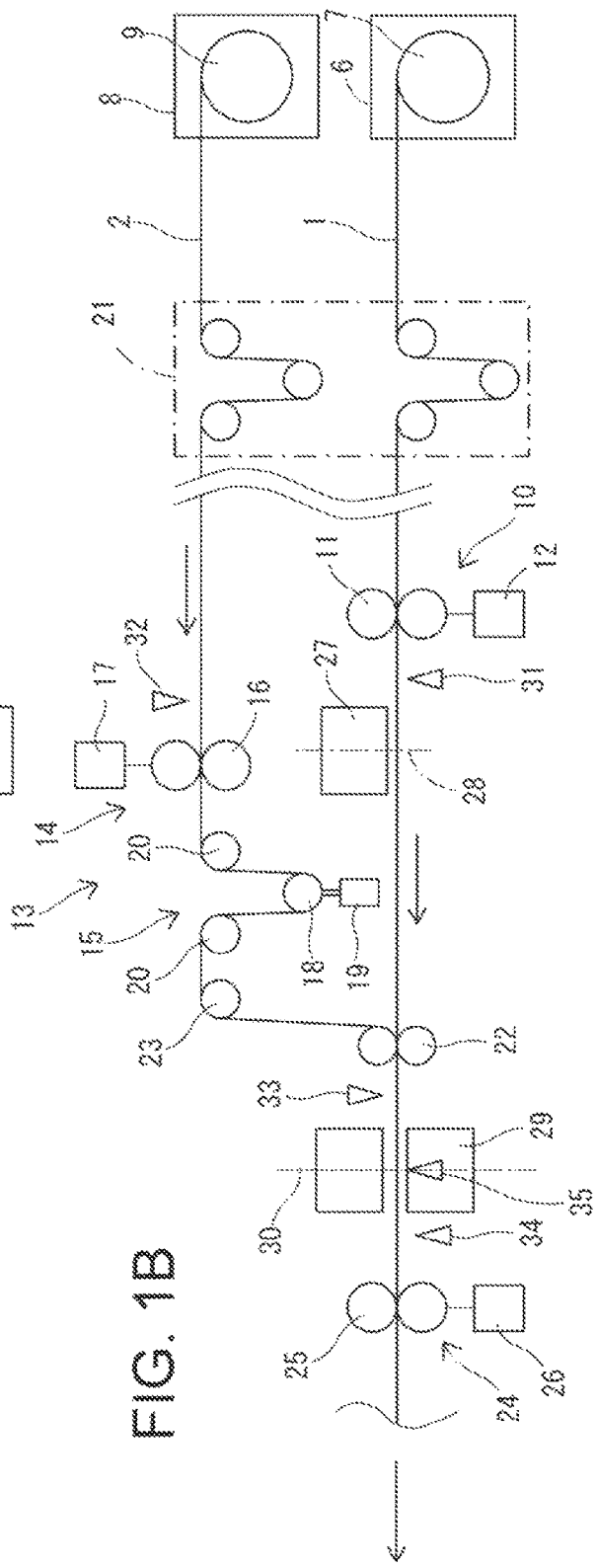
FIG. 1B is a schematic side view of the bag making apparatus in FIG. 1A.

An alignment device illustrated in FIGS. 1A and 1B is incorporated into the bag making apparatus. The alignment device includes a first unrolling device 6 which supports a first roll 7 and continuously unrolls the first continuous sheet panel 1 from the first roll 7, and a second unrolling device 8 which supports a second roll 9 and continuously unrolls the second continuous sheet panel 2 from the second roll 9. In the implementation, the first sheet panel 1 is located lower, and the second sheet panel 2 is located upper.

The bag making apparatus includes a first feed device 10 configured to intermittently feed the first sheet panel 1. The first feed device 10 includes a pair of feed rollers 11 and a motor 12 for driving the pair of feed rollers 11. When the pair of feed rollers 11 is driven by the motor 12, at least one of the rollers revolves. This causes the first sheet panel 1 sandwiched between the pair of feed rollers 11 to be fed in the longitudinal direction thereof.

The bag making apparatus includes a second feed device 13. The second feed device 13 includes a feed unit 14 configured to intermittently feed the second sheet panel 2 and a stretching unit 15 disposed downstream of the feed unit 14 to apply tension to the second sheet panel 2 in an adjustable manner.

The feed unit 14 includes a pair of feed rollers 16 and a motor 17 for driving the pair of feed rollers 16. When the pair of feed rollers 16 is driven by the motor 17, at least one of the rollers revolves. This causes the second sheet panel 2 sandwiched between the pair of feed rollers 16 to be fed in the longitudinal direction thereof.

The stretching unit 15 includes a stretching roller 18 that engages with the second sheet panel 2 to apply tension to the second sheet panel 2, an actuator 19 (e.g., an air cylinder) that moves the stretching roller 18, and two guide rollers 20 that are located upstream and downstream adjacent to the stretching roller 18. In the implementation, the tension of the second sheet panel 2 increases when the stretching roller 18 is moved downward by the actuator 19, and decreases when the stretching roller 18 is moved upward by the actuator 19. The stretching unit 15 can move the stretching rollers 18 to adjust the tension of the second sheet panel 2, thereby stretching the second sheet panel 2.

As illustrated in FIG. 1B, the alignment device includes a well-known dancer device 21 disposed between the first unrolling device 6 and the first feed device 10 and between the second unrolling device 8 and the second feed device 13 to appropriately convert the continuous feed of the respective first and second sheet panels 1 and 2 into the intermittent feed.

The alignment device includes a pair of guide rollers 22 disposed downstream of the first and second feed devices 10 and 13. The first sheet panel 1 is fed to the pair of guide rollers 22, and the second sheet panel 2 is fed to the pair of guide rollers 22 via a guide roller 23, so that the first and second sheet panels 1 and 2 pass through the pair of guide rollers 22. This causes the first and second sheet panels 1 and 2 to be superposed on each other by the pair of guide rollers 22 and be fed out of the pair of guide rollers 22 in the superposed state.

The aligning device includes a third feed device 24 disposed downstream of the pair of guide rollers 22 to intermittently feed the first and second sheet panels 1 and 2 which have been superposed on each other by the pair of guide rollers 22.

The third feed device 24 includes a pair of feed rollers 25 and a motor 26 for driving the pair of feed rollers 25. When the pair of feed rollers 25 is driven by the motor 26, at least one of the rollers revolves. This causes the first and second sheet panels 1 and 2 sandwiched between the pair of feed rollers 25 to be fed in the longitudinal direction thereof.

For example, rubber rollers are used as the pairs of feed rollers 11, 16 and 25. Servo motors are used as the motors 12, 17, and 26.

The alignment device includes a first fixing device 27. The first fixing device 27 supplies an additional component 3 to the first sheet panel 1 every intermittent feed cycle. The first fixing device 27 then fixes the additional component 3 to the first sheet panel 1 at the first fixing position 28 downstream of the first feed device 10 and upstream of the pair of guide rollers 22 during every pause phase of the intermittent feed cycle.

The first fixing device 27 in the implementation is a side gusset supply device configured to supply a side gusset 3 as the additional component to the first sheet panel 1 in the width direction of the sheet panel 1, arrange the side gusset 3 in the width direction of the sheet panel 1 such that the longitudinal centerline of the side gusset 3 is aligned with the first fixing position 28, and temporarily fix the side gusset 3 to the first sheet panel 1 by means of ultrasonic-sealing or heat-sealing. Since such a side gusset supply device is well known, its explanation is omitted. As is well-known, the side gusset 3 is supplied to the first sheet panel 1 in a state of being folded in advance in halves on the opposite sides thereof with respect to the longitudinal centerline thereof.

The first fixing device 27 places the side gusset 3 on the lower sheet panel 1 and temporarily fixes it to the sheet panel 1. Therefore, when the first and second sheet panels 1 and 2 are superposed on each other by the pair of guide rollers 22, the side gusset 3 is interposed between the first and second sheet panels 1 and 2.

The alignment device includes a second fixing device 29. The second fixing device 29 fixes the second sheet panel 2 to the additional component 3 (which has already been fixed to the first sheet panel 1) at the second fixing position 30 downstream of the pair of guide rollers 22 and upstream of the third feed device 24 during every pause phase of the intermittent feed cycle. In other words, the second fixing device 29 fixes the first and second sheet panels 1 and 2 to each other via the additional component 3.

The second fixing device 29 in the implementation is a seal device (temporary seal device) configured to seal the side gusset 3 as the additional component to the first and second sheet panels 1 and 2 in the form of heat-sealing or ultrasonic-sealing. Thereby, a temporary sealed section 49 is formed. This temporary sealed section 49 is used to form open surfaces 54 (FIG. 2A) in the side gusset 3. Since such a seal device is well known, its explanation is omitted.

Figure 4A:
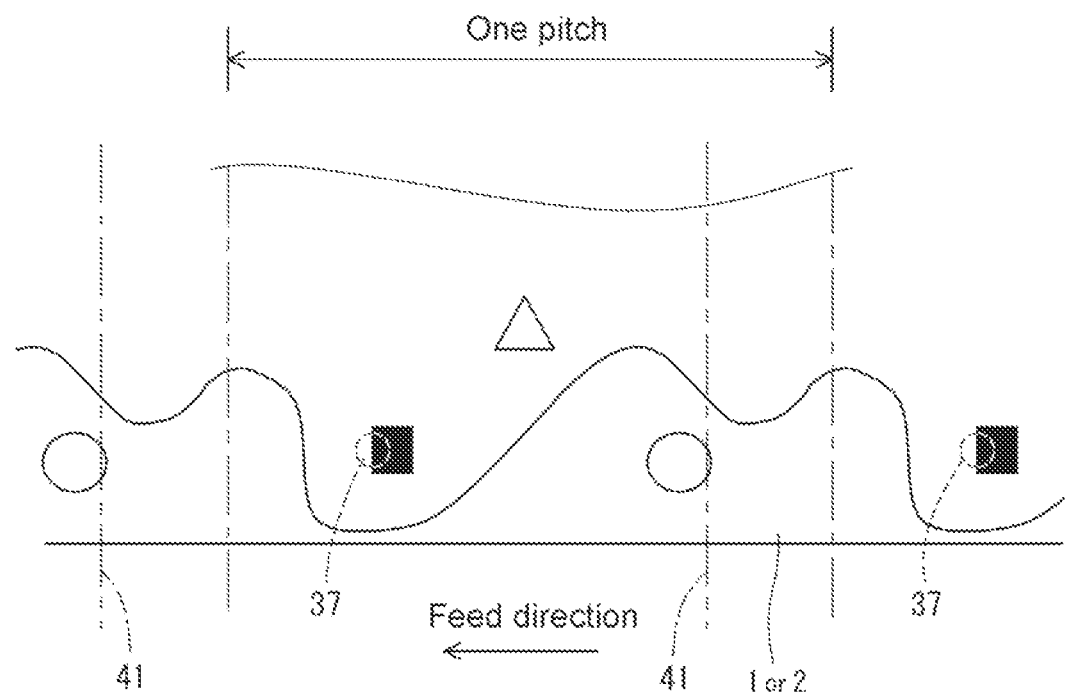
FIG. 4A partially illustrates a first or second sheet panel.

The first and second sheet panels 1 and 2 are illustrated in FIG. 4A. Each of the first and second sheet panels 1 and 2 has print patterns that repeat at a constant print pitch.

Figure 4B:
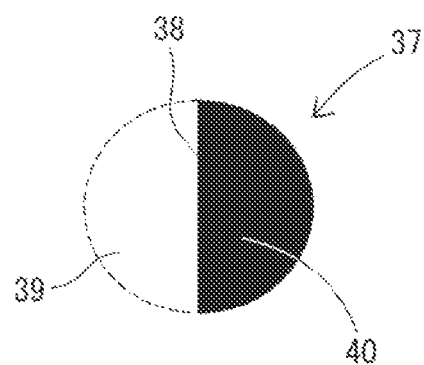
FIG. 4B is an enlarged view of a detection point in FIG. 4A.

A detection point 37 is included at the predetermined position in each of the print patterns. Therefore, the detection points 37 repeat at the print pitch. As illustrated in FIG. 4B, each of the detection points 37 in the implementation includes a line 38 which largely changes the contrast in the feed direction of the sheet panels 1 and 2. In other words, the detection point 37 is sectioned by the line 38 into two regions 39 and 40 which are different in contrast from one another. The above is merely an example, and of course, the first and second sheet panels 1 and 2 may have different print patterns (and thus detection points 37 with different characteristics) from one another.

In addition, design positions 41 are predetermined on each of the first and second sheet panels 1 and 2 at that print pitch. This design position 41 is the position in the design at which the side gusset 3 as the additional component should be fixed.

The first and second sheet panels 1 and 2 have been initially set in the bag making apparatus such that the print patterns of the first sheet panel 1 and the print patterns of the second sheet panel 2 are roughly aligned with each other. In the implementation, the facing surfaces of the first and second sheet panels 1 and 2 are formed of sealant, and their opposite surfaces are formed of base material. The outer surfaces of the side gussets 3 folded in halves are formed of sealant, and their inner surfaces are formed of base material.

Referring back to FIG. 1B, the alignment device includes a first sensor 31 disposed to be able to detect the detection points 37 of the first sheet panel 1 at a position downstream of the first feed device 10 (the pair of feed rollers 11) and upstream of the pair of guide rollers 22.

The alignment device further includes at least one second sensor 32 and 33 disposed to detect the detection points 37 of the second sheet panel 2 at a position upstream of the second fixing device 29. In this implementation, two sensors, which are the upstream sensor 32 and the downstream sensor 33, are used as the second sensors. The upstream sensor 32 is disposed to be able to detect the detection points 37 of the second sheet panel 2 at a position upstream of the second feed device 13 (the pair of feed rollers 16) and downstream of the dancer device 21. The downstream sensor 33 is disposed to be able to detect the detection points 37 of the second sheet panel 2 at a position downstream of the pair of guide rollers 22 and upstream of the second fixing device 29.

The alignment device further includes a third sensor 34 disposed to be able to detect the detection points 37 of the first sheet panel 1 at a position downstream of the second fixing device 29 and upstream of the third feed device 24 (the pair of feed rollers 25).

These sensors 31 to 34 in the implementation are optical sensors.

The first feed device 10 adjusts the intermittent feed amount thereof based on the output of the first sensor 31 such that a design position 41 of the first sheet panel 1 is aligned with the first fixing position 28 every pause phase of the intermittent feed cycle.

For example, the first sensor 31 is disposed such that the lines 38 of the detection points 37 of the sheet panel 1 pass through the detecting position of the first sensor 31. The first sensor 31 is configured to be movable in the feed direction and its opposite direction. The first sensor 31 detects the sheet panel 1 at the predetermined timing when a line 38 would pass through that detecting position. If an area 39 of the detection point 37 is detected by the first sensor 31 at that timing, this means insufficient feed of the sheet panel 1. Therefore, during the pause phase of the intermittent feed cycle of the first sheet panel 1, the first sensor 31 is moved in the opposite direction to the feed direction until it detects a line 38. The first feed device 10 detects the movement amount of the first sensor 31 up to the moment when it detects the line 38, and then adds the number of revolutions corresponding to this movement amount, to the number of revolutions of the pair of feed rollers 11 for the next intermittent feed cycle.

Conversely, if an area 40 of the detection point 37 is detected by the first sensor 31 at the aforementioned predetermined timing, this means excessive feed of the first sheet panel 1. Therefore, during the pause phase of the intermittent feed cycle of the sheet panel 1, the first sensor 31 is moved in the feed direction until it detects a line 38. The first feed device 10 detects the movement amount of the first sensor 31 up to the moment when it detects the line 38, and then subtracts the number of revolutions corresponding to this movement amount, from the number of revolutions of the pair of feed rollers 11 for the next intermittent feed cycle. In this way, the intermittent feed amount (the number of revolutions of the pair of feed rollers 11) is adjusted in response to the output of the first sensor 31.

In an intermittent feed cycle, the feed speed of the sheet panel 1 gradually increases, becomes constant, and then decreases to zero. It is designed that a line 38 would pass through the detecting position of the first sensor 31 just before the sheet panel 1 is paused. Therefore, as a general control, the first feed device 10 halts the revolution of the pair of feed rollers 11 via the motor 12 at the moment when the first sensor 31 detects a line 38.

Repeating such control causes a line 38 of the first sheet panel 1 to be positioned at the detecting position of the first sensor 31 during every pause phase of the intermittent feed cycle. As mentioned above, the design positions 41 also repeat at the print pitch in the same way as the detection points 37 do. Placing the first fixing device 27 in position in advance allows the positional relationship between the design position(s) 41 of the first sheet panel 1 and the first fixing position 28 of the first fixing device 27 to correspond to the positional relationship between the detecting point(s) 37 of the first sheet panel 1 and the detecting position of the first sensor 31. This allows a design position 41 of the first sheet panel 1 to be aligned with the first fixing position 28 every pause phase of the intermittent feed cycle.

The third feed device 24 adjusts the intermittent feed amount thereof based on the output of the third sensor 34 such that a design position 41 of the first sheet panel 1 is aligned with the second fixing position 30 every pause phase of the intermittent feed cycle. The specific control by it is the same as the control by the first feed device 10. That is, the third feed device 24 adjusts the number of revolutions of the pair of feed rollers 25 in response to the output of the third sensor 34 to position a line 38 of the first panel 1 at the detecting position of the third sensor 34 every intermittent feed cycle. This causes a design position 41 of the first sheet panel 1 to be aligned with the second fixing position 30 during every pause phase of the intermittent feed cycle.

The second feed device 13 adjusts the tension of the second sheet panel 2 and the intermittent feed amount of the feed unit 14 based on the output of the second sensors 32 and 33 such that a design position 41 of the second sheet panel 2 is aligned with the second fixing position 30 during every pause phase of the intermittent feed cycle.

In the implementation, the feed unit 14 adjusts the number of revolutions of the pair of feed rollers 16 in response to the output of the upstream sensor 32 to position a line 38 of the second sheet panel 2 at the detecting position of the upstream sensor 32 during every pause phase of the intermittent feed cycle. This control is the same as the control by the first feed device 10.

The stretching unit 15 adjusts the tension of the second sheet panel 2 in response to the output of the downstream sensor 33. Similar to the first sensor 31, the downstream sensor 33 detects the second sheet panel 2 at the predetermined timing when a line 38 would pass through the detecting position of the downstream sensor 33. If an area 39 is detected by the downstream sensor 33 at that timing, this means late feed of the second sheet panel 2. If so, in order to increase the feed amount, the stretching unit 15 decreases the tension of the second sheet panel 2 by moving the stretching roller 18 upward. This causes a slight decrease of the tension of the second sheet panel 2 in the section between the pair of feed rollers 16 and the pair of feed rollers 25, resulting in acceleration of the sheet panel feed at the second fixing position 30.

Conversely, if an area 40 of the detection point 37 is detected by the downstream sensor 33 at the aforementioned timing, this means excessive feed of the second sheet panel 2. If so, in order to decrease the feed amount, the stretching unit 15 increases the tension of the second sheet panel 2 by moving the stretching roller 18 downward. This causes a slight increase of the tension of the second sheet panel 2 in the section between the pair of feed rollers 16 and the pair of feed rollers 25, resulting in deceleration of the sheet panel feed at the second fixing position 30.

The adjustment of the intermittent feed amount of the pair of feed rollers 16 and the tension of the second sheet panel 2 absorbs the misalignment between the first and second sheet panel 1 and 2 that may occur in the section between the pair of feed rollers 16 and the pair of feed rollers 25. This allows a design position 41 of the second sheet panel 2 to be aligned with the second fixing position 30 every pause phase of the intermittent feed cycle.

As described above, since the first feed device 10 controls the feed of the first sheet panel 1 using the first sensor 31 to align the first sheet panel 1 with the first fixing position 28, the first fixing device 27 can fix a side gusset 3 (additional component) to the first sheet panel 1 at the correct position.

Since the second and third feed devices 13 and 24 control the feed of the first and second sheet panels 1 and 2 using the second and third sensors 32 to 34 to align the first and second sheet panels 1 and 2 with the second fixing position 30, the second fixing device 29 can fix the second sheet panel 2 to the first sheet panel 1 at the correct position via the side gusset(s) 3. Therefore, misalignment is prevented among the sheet panels 1 and 2 and the side gusset(s) 3 in the longitudinal direction of the sheet panels 1 and 2. Consequently, when the bags 5 are made as described below, the print patterns are aligned among its components 1, 2 and 3.

Figure 3:
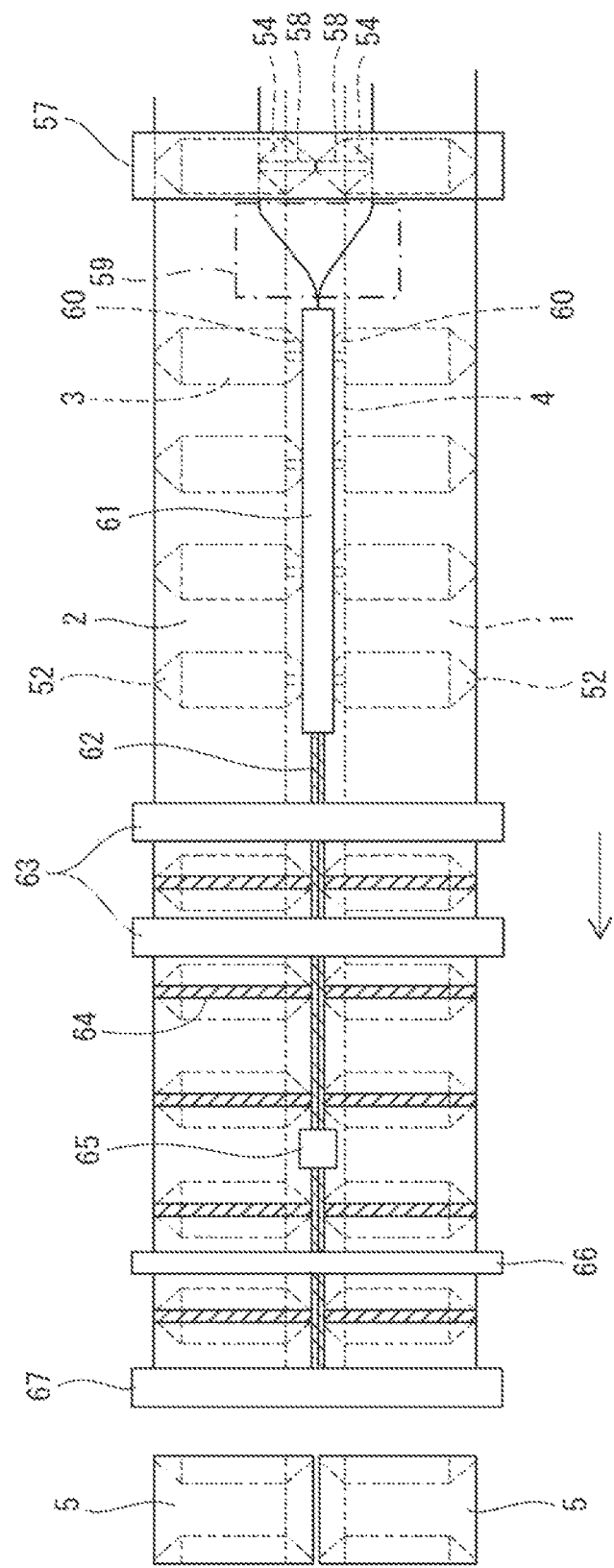
FIG. 3 is a schematic plan view of a downstream section of the bag making apparatus in FIG. 1A.

The other configurations of the bag making apparatus will be described below. FIGS. 2A and 2B illustrate the intermediate section of the bag making apparatus, and FIG. 3 illustrates the downstream section of the bag making apparatus. The bag making apparatus forms perforations 50 in the second sheet panel 2 in the longitudinal direction of the second sheet panel 2 using a perforation cutter (not shown), and forms perforations 51 in the side gusset 3 in the width direction of the side gusset 3 using another perforation cutter (not shown). When the sheet panels 1 and 2 are superposed on each other by the pair of guide rollers 22, these perforations 50 and 51 are aligned with each other. Alternatively, after the sheet panels 1 and 2 are superposed on each other, the perforations 50 and 51 are formed in the sheet panel 2 and the side gusset 3 by a single perforation cutter. The side gusset 3 in the implementation has auxiliary gussets 52 formed in advance at the opposite ends thereof.

A further pair of feed rollers 66 (FIG. 3) is disposed in the downstream section of the bag making apparatus to intermittently feed the sheet panels 1 and 2.

As the sheet panels 1 and 2 are fed, a guide device 53 guides the sheet panel 2 such that the sheet panel 2 is divided along the perforations 50. The temporary sealed section 49 adheres one layer of the side gusset 3 to the sheet panel 1 and the other layer to the sheet panel 2. Therefore, at this time, the other layer of the side gusset 3 is pulled up, so that the side gusset 3 is cut open along its perforations 51 to be divided into two. This results in forming rhombic-shaped open surfaces 54. The guide device 53 includes guide rollers, plates, pinch rollers, etc.

As the sheet panels 1 and 2 are fed, a bottom gusset supply device 55 guides a continuous bottom gusset 4 via a guide roller 56, arrange it in the longitudinal direction of the sheet panels 1 and 2 to superpose it on the open surfaces 54.

An open surface seal device 57 heat-seals the side gusset 3 to the sheet panels 1 and 2 and the bottom gusset 4 along the diagonals of the open surfaces 54 in the width direction of the sheet panels 1 and 2 every intermittent feed cycle. Thereby, auxiliary sealed sections 58 are formed. The bottom gusset 4 is adhered to the open surfaces 54 by the auxiliary sealed sections 58.

As the sheet panels 1 and 2 are fed, another guide device 59 guides the sheet panel 2 such that the sheet panel 2 is folded back. The folding back of the sheet panel 2 causes the open surfaces 54 to be closed, resulting in forming auxiliary gussets 60 from the open surfaces 54. In addition, the folding back of the sheet panel 2 causes the bottom gusset 4 to be folded in halves on the opposite sides thereof with respect to the longitudinal centerline thereof (which is parallel to the longitudinal direction of the sheet panels 1 and 2).

As illustrated in FIG. 3, a longitudinal seal device 61 heat-seals the sheet panes 1 and 2 and the bottom gusset 4 at the longitudinal centerline of the bottom gusset 4 in the longitudinal direction of the sheet panels 1 and 2 to form a longitudinal sealed section 62 every intermittent feed cycle. A cross seal device 63 heat-seals the sheet panels 1 and 2, the side gusset 3, and the bottom gusset 4 at the longitudinal centerline of the side gusset 3 in the width direction of the sheet panels 1 and 2 to form a cross sealed section 64 every intermittent feed cycle of the sheet panels 1 and 2.

As the sheet panels 1 and 2 are fed, a slit device 65 slits the sheet panels 1 and 2, the side gusset 3, and the bottom gusset 4 at the longitudinal centerline of the bottom gusset 4 in the longitudinal direction of the sheet panels 1 and 2.

A cross cut device 67 cross-cuts the sheet panels 1 and 2, the side gusset 3, and the bottom gusset 4 at the cross sealed section 64 in the width direction of the sheet panels 1 and 2 every intermittent feed cycle of the sheet panels 1 and 2. Thereby, in the implementation, two bags 5 are made each time the cross-cutting is performed.

In the case where the bottom gusset 4 also has print patterns, the alignment device may further include additional sensors 70 and 71 for alignment of the bottom gusset 4 with the sheet panel 1 as illustrated in FIG. 2B. The detection points (not shown) are printed on the bottom gusset 4 at the same print pitch as one of the sheet panels 1 and 2. The sensor 70 detects the detection points 37 of the sheet panel 1, and the sensor 71 detects the detection points of the bottom gusset 4.

For example, if the sensor 71 does not detect a detection point of the bottom gusset 4 at the timing when the sensor 70 detects a detection point 37 of the sheet panel 1, this means a delay in supplying the bottom gusset 4. Thus, if so, the alignment device decreases the upstream tension of the bottom gusset 4. Conversely, if the sensor 71 has already detected a detection point of the bottom gusset 4 at the timing when the sensor 70 detects a detection point 37 of the sheet panel 1, this means an advance in supplying the bottom gusset 4. Thus, if so, it increases the upstream tension of the bottom gusset 4. Repeating this prevents the positional misalignment between the bottom gusset 4 and the sheet panel 1.

Consequently, the implementation prevents positional misalignment among the sheet panels 1 and 2, the side gusset(s) 3, and the bottom gusset 4 in the longitudinal direction of the sheet panels 1 and 2. Therefore, when the bags 5 are completed, the print patterns are aligned with one another among the components 1, 2, 3, and 4. The good appearance of the bags 5 is guaranteed.

[Second implementation] The second implementation will be described below. The explanation of the same configurations as those in the first implementation is omitted.

FIGS. 5A and 5B illustrate the alignment device in the second implementation. This implementation dispenses with the upstream sensor 32 (FIG. 1B). Therefore, the second sensor consists of the single downstream sensor 33. The second feed device 13 adjusts the tension of the second sheet panel 2 and the intermittent feed amount of the feed unit 14 only based on the output of the downstream sensor 33.

Specifically, the stretching unit 15 adjusts the tension of the second sheet panel 2 in response to the output of the downstream sensor 33 in the same way as the first implementation, and the feed unit 14 adjusts the number of revolutions of the pair of feed rollers 16 in response to the adjustment of the tension of the second sheet panel 2.

More specifically, if the output of the downstream sensor 33 indicates the late feed of the second sheet panel 2, the stretching unit 15 slightly moves the stretching roller 18 upward to decrease the tension of the second sheet panel 2. In response to the decrease of the tension (the upward movement of the stretching roller 18), the feed unit 14 then determines that the feed amount thereof is insufficient, and increases the number of revolutions of the pair of feed rollers 16 for the next intermittent feed cycle to the appropriate number of revolutions.

Conversely, if the output of the downstream sensor 33 indicates the excessive feed of the second sheet panel 2, the stretching unit 15 slightly moves the stretching roller 18 downward to increase the tension of the second sheet panel 2. In response to the increase of the tension (the downward movement of the stretching roller 18), the feed unit 14 then decreases the number of revolutions of the pair of feed rollers 16 for the next intermittent feed cycle to the appropriate number of revolutions.

Such control also allows a design position 41 of the second sheet panel 2 to be aligned with the second fixing position 30 during every pause phase of the intermittent feed cycle, preventing positional misalignment between the first and second sheet panels 1 and 2 at the second fixing position 30.

The above implementations can be modified in various ways. For example, the first fixing position 28 where the first fixing device 27 fixes a side gusset 3 may be a position downstream of the pair of feed rollers 11 and upstream of the first sensor 31.

In the bag making apparatus of each implementation, sheet panels each with print patterns are used as the first and second sheet panels 1 and 2. Regarding the first sheet panel 1, the intermittent feed amount of the upstream first feed device 10 is controlled based on the output of the first sensor 31, i.e., the positions of the print patterns of the first sheet panel 1. Furthermore, the intermittent feed amount of the downstream third feed device 24 is controlled based on the output of the third sensor 34, i.e., the positions of the print patterns of the first sheet panel 1. Thus, the intermittent feed amounts at the respective positions of both devices 10 and 24 are kept equal to each other, so that the tension of the sheet panel 1 is maintained constant.

However, the output of the sensor 31 and the output of the sensor 34 are not used in replacing the sheet panels with new ones in the bag making apparatus of each implementation. In addition, the sheet panels with no print patterns can be used in the bag making apparatus of each implementation, also in this case, the output of the sensor 31 and the output of the sensor 34 are not used. Under such circumstances, even when attempting to make the intermittent feed amount of the first pair of feed rollers 11 and the intermittent feed amount of the third pair of feed rollers 25 the same as each other, these intermittent feed amounts may differ from one another due to a subtle difference in roller diameter and/or the number of roller revolutions. Therefore, the tension of the first sheet panel 1 may become too high or too low between the first feed device 10 and the third feed device 24.

Thus, when being replaced with a new sheet panel 1, the new first sheet panel 1 may be fed by the third pair of feed rollers 25 and tensioned correctly by the upstream dancer 21 with the grip by the first pair of feed rollers 11 released. This solves the above problem regarding the tension of the first sheet panel 1 and ensures proper feeding. After the new first sheet panel 1 is set in position, the first pair of feed rollers 11 and the third pair of feed rollers 25 can be controlled based on the output of the first sensor 31 and the output of the third sensor 34, respectively, to achieve accurate feeding.

In each embodiment, the closer the first feed device 10 (the pair of feed rollers 11), the first sensor 31, and the first fixing position 28 are located to one another, the higher the accuracy of alignment (positioning) is achieved. Similarly, the closer the third feed device 24 (the pair of feed rollers 25), the third sensor 34, and the second fixing position 30 are located to one another, the higher the accuracy of alignment is achieved.

Figure 6:
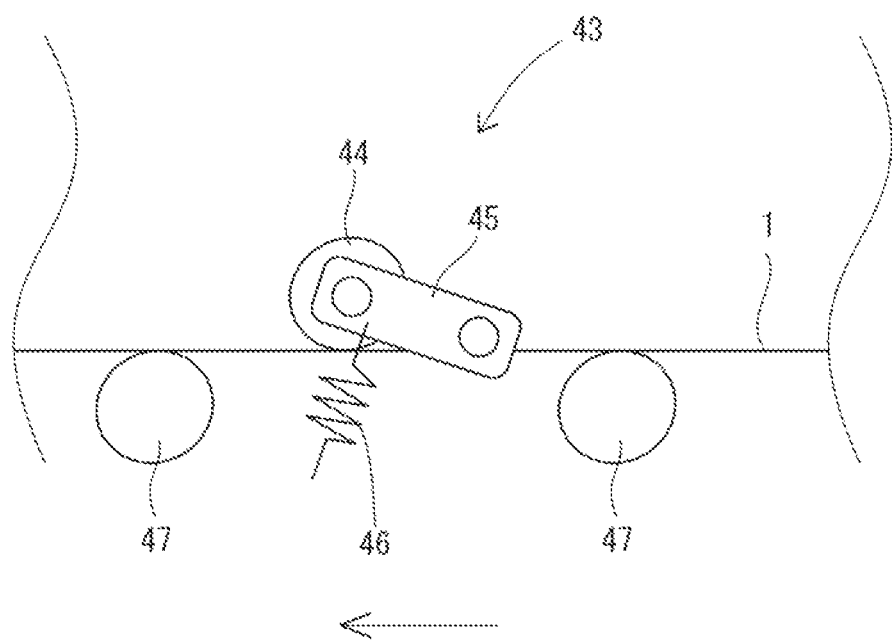
FIG. 6 is a side view which illustrates a tension application unit.

A tension application unit 43 as illustrated in FIG. 6 may be disposed downstream of the pair of feed rollers 11 and upstream of the pair of feed rollers 25 to apply tension to the first sheet panel 1. The tension application unit 43 includes, for example, an application roller 44 that engages with the first sheet panel 1 to apply tension to it, a support member 45 that rotatably supports the application roller 44, a biasing member 46 (e.g., a spring) that biases the application roller 44 toward the first sheet panel 1, and two guide rollers 47 that are located upstream and downstream adjacent to the application roller 44.

Due to the long distance from the first fixing position 28 to the second fixing position 30, there might be a possibility that the tension of the first sheet panel 1 becomes too low in the section from the pair of feed rollers 11 to the pair of feed rollers 25, resulting in sag of the first sheet panel 1. In such instance, the tension application unit 43 is useful for applying tension to the first sheet panel 1 to ensure a minimum degree of tension.

There also might be a possibility that the tension of the first sheet panel 1 becomes too high in the aforementioned section. To address this, the third sensor 34 and the downstream sensor 33 may be configured to be movable in the longitudinal direction of the first sheet panel 1 within a minute range in conjunction with each other by the same distance. In addition, a fourth sensor 35 for detecting the detection points 37 of the first sheet panel 1 may be attached to the second fixing device 29. By arranging as such, it is possible to, only when adjusting the position of the third sensor 34, shift the position of the second fixing device 29 in conjunction with it using the fourth sensor 35, and thus shift the second fixing position 30 in accordance with the positional adjustment of the third sensor 34.

Although the alignment device is incorporated into the two-line bag baking apparatus, it may be incorporated into a single-line bag making apparatus or a multi-line bag making apparatus which has three or more lines. Although the side gussets 3 are used as the additional components, other components of the bags may be incorporated into the first and second sheet panels 1 and 2 by the alignment device.

What is claimed is:

1. An alignment device for use in a bag making apparatus for making bags from a first continuous sheet panel, a second continuous sheet panel, and additional components, both of the first and second continuous sheet panels having print patterns that repeat at a print pitch and each include a detection point therein, wherein design positions are predetermined on each of the first and second continuous sheet panels at the print pitch, the alignment device comprising:
a first feed device configured to intermittently feed the first continuous sheet panel;
a second feed device comprising a feed unit configured to intermittently feed the second continuous sheet panel and a stretching unit disposed downstream of the feed unit to apply tension to the second continuous sheet panel in an adjustable manner;
a pair of guide rollers disposed downstream of the first and second feed devices;
a third feed device disposed downstream of the pair of guide rollers to intermittently feed the first and second continuous sheet panels superposed on each other by the pair of guide rollers;
a first fixing device configured to fix an additional component to the first continuous sheet panel at a first fixing position downstream of the first feed device and upstream of the pair of guide rollers during every pause phase of an intermittent feed cycle;
a second fixing device configured to fix the second continuous sheet panel to the additional component at a second fixing position downstream of the pair of guide rollers and upstream of the third feed device during every pause phase of an intermittent feed cycle;
a first sensor for detecting the detection point of the first continuous sheet panel at a position downstream of the first feed device and upstream of the pair of guide rollers;
at least one second sensor for detecting the detection point of the second continuous sheet panel at a position upstream of the second fixing device; and
a third sensor for detecting the detection point of the first continuous sheet panel at a position downstream of the second fixing device and upstream of the third feed device,
the first feed device being further configured to adjust an intermittent feed amount thereof based on output of the first sensor such that a design position of the first sheet panel is aligned with the first fixing position during every pause phase of an intermittent feed cycle,
the third feed device being further configured to adjust an intermittent feed amount thereof based on output of the third sensor such that the design position of the first continuous sheet panel is aligned with the second fixing position during every pause phase of an intermittent feed cycle,
the second feed device being further configured to adjust the tension and an intermittent feed amount of the feed unit based on output of the at least one second sensor such that a design position of the second continuous sheet panel is aligned with the second fixing position every pause phase of an intermittent feed cycle,
wherein the at least one second sensor comprises a downstream sensor for detecting the detection point of the second continuous sheet panel at a position downstream of the pair of guide rollers and upstream of the second fixing device, and
wherein the stretching unit is configured to adjust the tension in response to output of the downstream sensor.

2. The alignment device of claim 1, wherein the stretching unit comprises:
a stretching roller for engaging with the second continuous sheet panel;
an actuator for moving the stretching roller; and
two guide rollers located upstream and downstream adjacent to the stretching roller.

3. The alignment device of claim 1, wherein the at least one second sensor further comprises an upstream sensor for detecting the detection point of the second continuous sheet panel at a position upstream of the feed unit,
wherein the feed unit is configured to adjust the intermittent feed amount thereof in response to output of the upstream sensor.

4. The alignment device of claim 1,
wherein the feed unit is configured to adjust the intermittent feed amount thereof in response to adjustment of the tension.

5. The alignment device of claim 1, wherein the first fixing device is a side gusset supply device configured to supply a side gusset as the additional component to the first continuous sheet panel, arrange the side gusset in a width direction of the first continuous sheet panel, and temporarily fix the side gusset to the first continuous sheet panel, and
wherein the second fixing device is a seal device configured to seal the side gusset to the first and second continuous sheet panels.

6. The alignment device of claim 1, wherein the first feed device is configured to intermittently feed the first continuous sheet panel unrolled from a first roll, and
wherein the second feed device is configured to intermittently feed the second continuous sheet panel unrolled from a second roll.

\* \* \* \* \*